US009940934B2

(12) United States Patent
Sachdev (10) Patent No.: US 9,940,934 B2
(45) Date of Patent: Apr. 10, 2018

(54) ADAPTIVE VOICE AUTHENTICATION SYSTEM AND METHOD

(71) Applicant: Uniphore Software Systems, Chennai, Tamil Nadu (IN)

(72) Inventor: Umesh Sachdev, Chennai (IN)

(73) Assignee: UNIPHONE SOFTWARE SYSTEMS, Chennai (IN)

( * ) Notice: Subject to any disclaimer, the term of this patent is extended or adjusted under 35 U.S.C. 154(b) by 44 days.

(21) Appl. No.: 15/064,740

(22) Filed: Mar. 9, 2016

(65) Prior Publication Data

US 2017/0140760 A1   May 18, 2017

(30) Foreign Application Priority Data

Nov. 18, 2015  (IN) ............................ 6215/CHE/2015

(51) Int. Cl.
| | | |
|---|---|---|
| *G10L 15/00* | (2013.01) | |
| *G10L 17/04* | (2013.01) | |
| *G10L 17/02* | (2013.01) | |
| *G10L 17/06* | (2013.01) | |
| G10L 25/24 | (2013.01) | |
| G10L 25/75 | (2013.01) | |
| G10L 25/15 | (2013.01) | |

(52) U.S. Cl.
CPC .............. *G10L 17/04* (2013.01); *G10L 17/02* (2013.01); *G10L 17/06* (2013.01); *G10L 25/15* (2013.01); *G10L 25/24* (2013.01); *G10L 25/75* (2013.01)

(58) Field of Classification Search
CPC ......... G10L 17/04; G10L 17/00; G06F 21/32; G06F 17/2211; G06Q 20/4016; G06Q 20/40

USPC ............ 704/246, 231, 233, 236; 705/35, 44; 713/166, 168; 726/17, 22, 26
See application file for complete search history.

(56) References Cited

U.S. PATENT DOCUMENTS

| | | | | |
|---|---|---|---|---|
| 8,056,128 B1 * | 11/2011 | Dingle | .............. | G06F 17/30705 |
| | | | | 726/22 |
| 8,225,413 B1 * | 7/2012 | De | ...................... | G06F 21/6245 |
| | | | | 726/22 |
| 9,032,217 B1 * | 5/2015 | Brandwine | ............. | G06F 21/44 |
| | | | | 713/185 |
| 2005/0097320 A1 * | 5/2005 | Golan | ..................... | G06F 21/40 |
| | | | | 713/166 |
| 2006/0090073 A1 * | 4/2006 | Steinberg | ................ | G06F 21/31 |
| | | | | 713/170 |

(Continued)

*Primary Examiner* — Michael Colucci
(74) *Attorney, Agent, or Firm* — Harness, Dickey & Pierce, PLC (57) ABSTRACT

An adaptive voice authentication system is provided. The adaptive voice authentication system includes an adaptive module configured to compare a feature quality index of the plurality of authentication features and the plurality of enrollment features and dynamically replace and store one or more enrollment features with one or more authentication features to form a plurality of updated enrollment features. The adaptive module is configured to generate an updated enrollment voice print model from the plurality of the updated enrollment features. The adaptive module is further configured to compare the updated enrollment voice print model with the previously stored enrollment voice print model and dynamically update the previously stored enrollment voice print model with the updated enrollment voice print model based on a model quality index.

13 Claims, 6 Drawing Sheets

(56) References Cited

U.S. PATENT DOCUMENTS

| | | | | |
|---|---|---|---|---|
| 2006/0106605 A1* | 5/2006 | Saunders | G10L 17/04 | 704/246 |
| 2006/0271457 A1* | 11/2006 | Romain | G06Q 20/04 | 705/35 |
| 2007/0177768 A1* | 8/2007 | Tsantes | G06Q 10/00 | 382/115 |
| 2008/0300877 A1* | 12/2008 | Gilbert | G06Q 40/00 | 704/246 |
| 2009/0055193 A1* | 2/2009 | Maislos | G06F 21/32 | 704/273 |
| 2009/0319270 A1* | 12/2009 | Gross | G10L 15/22 | 704/246 |
| 2010/0228656 A1* | 9/2010 | Wasserblat | G06Q 10/10 | 705/35 |
| 2011/0010543 A1* | 1/2011 | Schmidt | H04W 12/10 | 713/168 |
| 2011/0112838 A1* | 5/2011 | Adibi | G10L 17/02 | 704/249 |
| 2011/0161076 A1* | 6/2011 | Davis | G06F 3/04842 | 704/231 |
| 2012/0284026 A1* | 11/2012 | Cardillo | G10L 17/08 | 704/246 |
| 2013/0232073 A1* | 9/2013 | Sheets | G06Q 20/40145 | 705/44 |
| 2014/0136194 A1* | 5/2014 | Warford | G10L 17/02 | 704/233 |
| 2014/0279486 A1* | 9/2014 | Kessler | G06Q 20/4016 | 705/42 |
| 2014/0330563 A1* | 11/2014 | Faians | G10L 17/04 | 704/236 |
| 2015/0067822 A1* | 3/2015 | Randall | G06F 21/32 | 726/17 |
| 2015/0095019 A1* | 4/2015 | de Zeeuw | G06F 17/2211 | 704/9 |

* cited by examiner

ADAPTIVE VOICE AUTHENTICATION SYSTEM AND METHOD

PRIORITY STATEMENT

The present application hereby claims priority under 35 U.S.C. § 119 to Indian patent application number 6215/CHE/2015 filed Nov. 18, 2015, the entire contents of which are hereby incorporated herein by reference.

BACKGROUND

The invention relates generally to voice authentication systems, and more particularly to a system and a method for dynamically and constantly adapting a voice print model existent in voice biometric applications.

Typically, in a voice authentication system, enrolment of a user's voice sample is done only once and authentication of the user's voice sample is done multiple times over a long duration. The enrolment process of the user's voice sample is done minimal number of times to keep the system usable and alleviate the pain to the user. Hence a lot of emphasis is placed on the initial enrolment.

In certain situations, the initial parameters extracted from the user's voice sample may not be at the optimal level. Since the extracted user's voice samples are above the user set threshold level, the enrolment data is accepted and a voice print model is built for the user. However, due to weak extracted voice samples, a weak voice print model is built for the user, resulting to have a higher false rejection rates during the authentication process.

In addition, the user's voice sample can fluctuate on several conditions such as biological ageing, several environment conditions like background noise, use of different microphones, quality of microphone etc. These fluctuations in the user's voice sample affects the authentication process resulting in increase in false rejection rates. The existing systems solve this problem by asking the users to enroll the voice sample all over again and generate a new voice print model once more to capture the change in conditions. It is often difficult and tedious process for the user to do the voice enrolment process again and again.

Therefore, a system and method is needed that automatically adapts the voice print model from time to time and correspondingly pre-processes the voice samples to eliminate the unnecessary factors affecting the optimality of the user's voice samples utilized for enrolment and authentication.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

According to some examples of the present disclosure, an adaptive voice authentication system is provided. The system includes a feature extractor configured to receive a user's enrolment voice sample and a user's authentication voice sample and configured to extract a plurality of enrolment features from the user's enrolment voice sample and a plurality of authentication features from the user's authentication voice sample. The user's enrolment voice sample is an initial voice sample and the user's authentication voice sample is a plurality of subsequent voice samples. The system also includes a voice print model generator configured to generate an enrolment voice print model from the plurality of enrolment features and an authentication voice print model from the plurality of authentication features. In addition, the system includes an authentication module configured to receive the authentication voice print model and authenticate the user based on the enrolment voice print model. The system also includes a storage module configured to store the plurality of enrolment features, the plurality of authentication features, the enrolment voice print model and the authentication voice print model. Furthermore, the system includes an adaptive module configured to compare a feature quality index of the plurality of authentication features and the plurality of enrolment features and dynamically replace and store one or more enrolment features with one or more authentication features to form a plurality of updated enrolment features. The adaptive module is configured to generate an updated enrolment voice print model from the plurality of the updated enrolment features. The adaptive module is further configured to compare the updated enrolment voice print model with the previously stored enrolment voice print model and dynamically update the previously stored enrolment voice print model with the updated enrolment voice print model based on a model quality index.

According to additional examples of the present disclosure a method for dynamically updating one or more enrolment features and an enrolment voice print model is provided. The method includes receiving a user's enrolment voice sample and a user's authentication voice sample and extracting a plurality of enrolment features from the user's enrolment voice sample and a plurality of authentication features from the user's authentication voice sample. The method also includes generating an enrolment voice print model from the plurality of enrolment features and an authentication voice print model from the plurality of authentication features. In addition, the method includes authenticating the user based on the enrolment voice print model. Furthermore, the method includes storing the plurality of enrolment features, the plurality of authentication features, the enrolment voice print model and the authentication voice print model. In addition, the method includes comparing the plurality of authentication features with the plurality of enrolment features and dynamically replacing and storing one or more enrolment features with one or more authentication features based on a feature quality index. The method also includes generating an updated enrolment voice print model from the plurality of the updated enrolment features. Moreover, the method also includes comparing the updated enrolment voice print model with the previously stored enrolment voice print model and dynamically updating the previously stored enrolment voice print model with the updated enrolment voice print model based on a model quality index.

DETAILED DESCRIPTION

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Voice Biometrics applications are a class of user authentication solutions that utilizes a user's voice to uniquely identify them. To uniquely identify the user, a voice print model is built from the user's voice and is used to uniquely identify the user during the authentication process. The system described herein employ several robust adaption and normalization techniques that deliver enhanced enrolment and authentication rates for users of the system.

Figure 1:
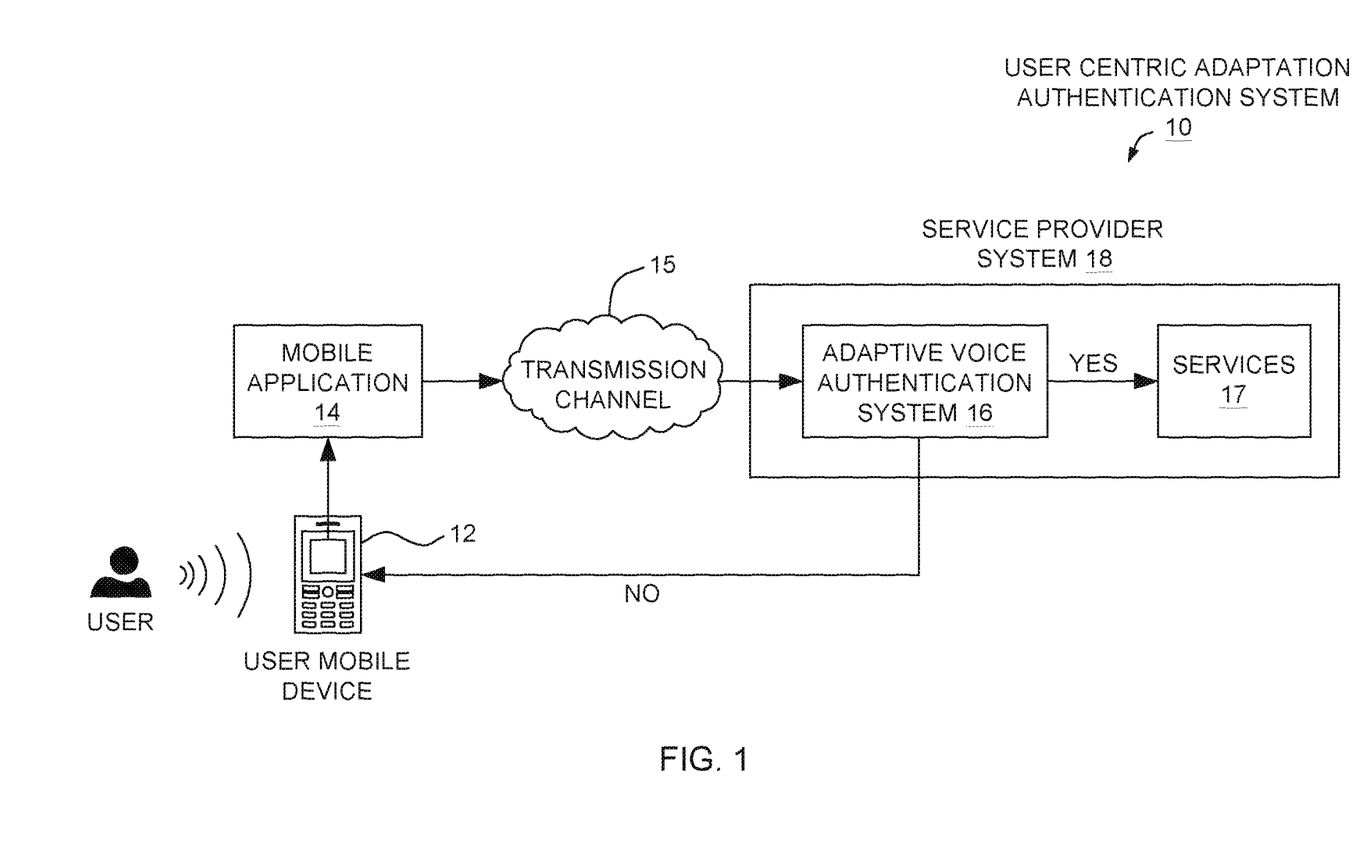
FIG. 1 is a block diagram of an example embodiment of a user-centric adaptation authentication system utilizing audio normalization mechanisms implemented according to aspects of the present technique.

FIG. 1 is a block diagram of an example embodiment of a user-centric adaptation authentication system utilizing audio normalization mechanisms implemented according to aspects of the present technique. The system 10 represents a user mobile device 12, a mobile application 14, a transmission channel 15, and a service provider system 18. The service provider system 18 includes an adaptive voice authentication system 16 to authenticate a user for accessing the services 17.

The system 10 depicts the use of a voice identification mechanism to analyze a user's unique information to verify his/her identity. As used herein, the term "user" may refer to natural people using their voice/audio that aids to uniquely identify them. Examples of users include consumers accessing the bank accounts, participating merchants of several organizations, customers transacting credit or debit cards, and the like. In particular, the system 10 is implemented for authorizing a user to obtain access to one or more services provided (as represented by reference numeral 17) by a remote service provider system 18.

The system 10 includes an input means such as a mobile application 14 installed on a user's mobile device 12 for prompting the user to speak a plurality of words. Moreover, the plurality of words spoken by the user are captured and stored by the mobile application 14. The mobile application 14 installed on the mobile device 12 operates under the control of a program stored therein and in response to the receipt of the spoken words from the user, transmits the spoken words to the service provider system 18. The spoken words are transmitted using a transmission channel as represented by reference numeral 15. The service provider system 18 includes an adaptive voice authentication system 16 to verify the user and correspondingly provide access to the services 17. For example, the services 17 may be several banking services and the service provider system 18 may be a bank.

For conciseness, the adaptive voice authentication system 16 described herein comprises a user-centric adaptation and audio normalization mechanisms to improve the enrolment and authentication rates for users of the system 10. By using automated user profile adaptation and normalization techniques, the usability of the authentication system is gained. The manner in which enrolment and authentication rates of the users are dynamically improved by adapting the voice print model from time to time and by normalizing and suppressing the channel and other environmental conditions is described in further detail below.

Figure 2:
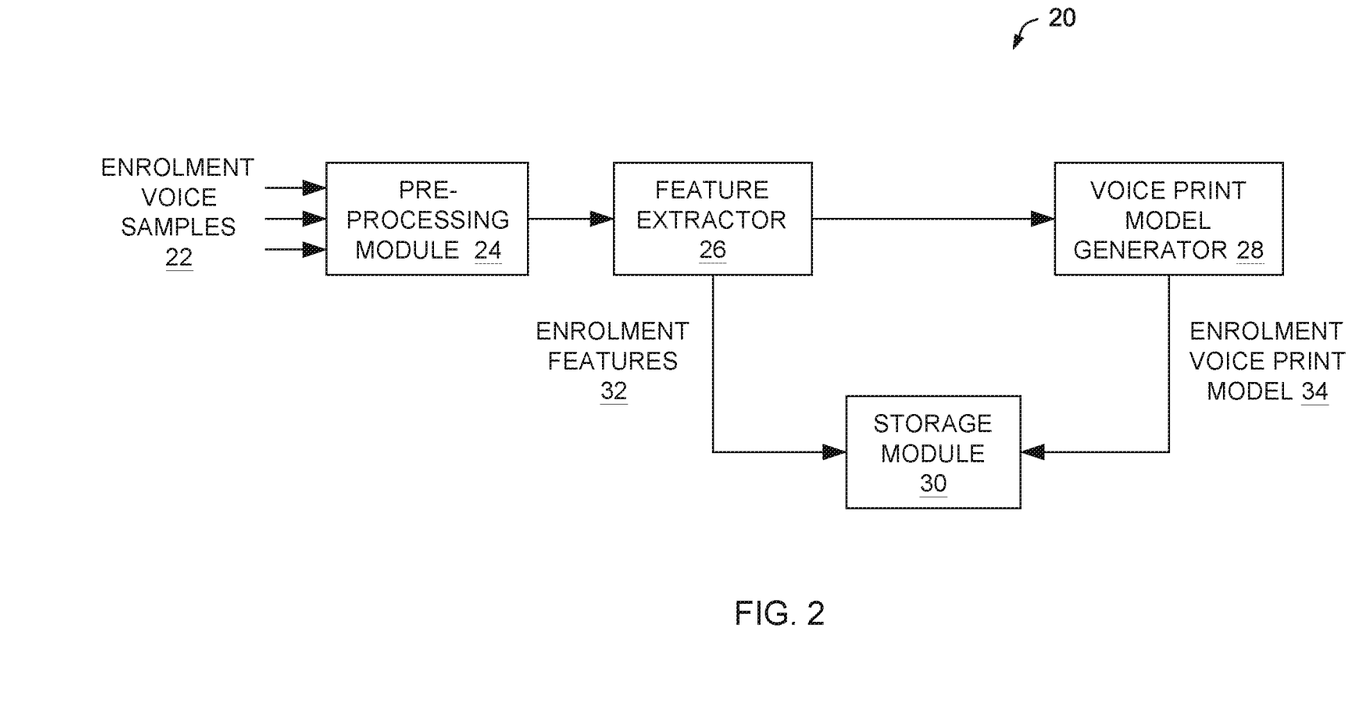
FIG. 2 is a block diagram of an example embodiment of an adaptive voice authentication system illustrating the components of voice enrolment application implemented according to aspects of the present technique.

FIG. 2 is a block diagram of an example embodiment of an adaptive voice authentication system illustrating the components of voice enrolment application implemented according to aspects of the present technique. The system 20 includes a pre-processing module 24, a feature extractor 26, a voice print model generator 28, and a storage module 30. Each component is described in further detail below.

Voice authentication systems analyze and extract salient features from user's voice for the purpose of authentication. The user's voice samples (as represented by reference numeral 22) are received by the pre-processing module 24. The received voice samples 22 may be the user's enrolment voice samples. In one embodiment, the enrolment technique is implemented when the user uses the system for the first time and is typically done only once. In the course of the enrolment, the user's enrolment voice samples 22 are received by the pre-processing module 24.

Pre-processing module 24 is configured to improve the user's enrolment voice sample by filtering a plurality of distortion elements. In one embodiment, the pre-processing module 24 is configured to employ filtering operations comprising clipping, smoothening and amplifying the user's enrolment voice sample 22. As a result of implementation of the pre-processing module 24, the enrolment rates are improved for all the speakers using variety of microphones under different loudness and noisy conditions.

Feature extractor 26 is configured to receive the user's pre-processed enrolment voice sample and further configured to extract a plurality of enrolment features (as represented by reference numeral 32) from the user's enrolment voice sample 22. The plurality of enrolment features 32 comprise vocal tract shape and length, short term and long term energy, fundamental pitch, formant features, speaking rate, prosody features, language and accent, nasality, cepstrum, emotional state or combinations thereof. In one embodiment, the enrolment features 32 extracted from the user's pre-processed enrolment voice samples are then modelled using statistical techniques to generate an 'enrolment voice print model' as represented by reference numeral 34. In one example embodiment, typically three features are extracted from the user's pre-processed voice sample.

Voice print model generator 28 is configured to generate an enrolment voice print model (as represented by reference numeral 34) from the user's improved/pre-processed enrolment voice sample. Storage module 30 is configured to store the plurality of enrolment features 32 and the enrolment voice print model 34. The stored enrolment features 32 of the user are compared with the features of the user received during the authentication process. The features of the user received during the authentication process are the authentication features and the voice print model generated using the authentication features is the authentication voice print model. The authentication voice print model is compared with the enrolment voice print model 34 to authenticate the user. The manner in which the authentication voice print model is generated and one or more enrolment features of the user are dynamically updated with authentication features of a higher quality is described in further detail below.

Figure 3:
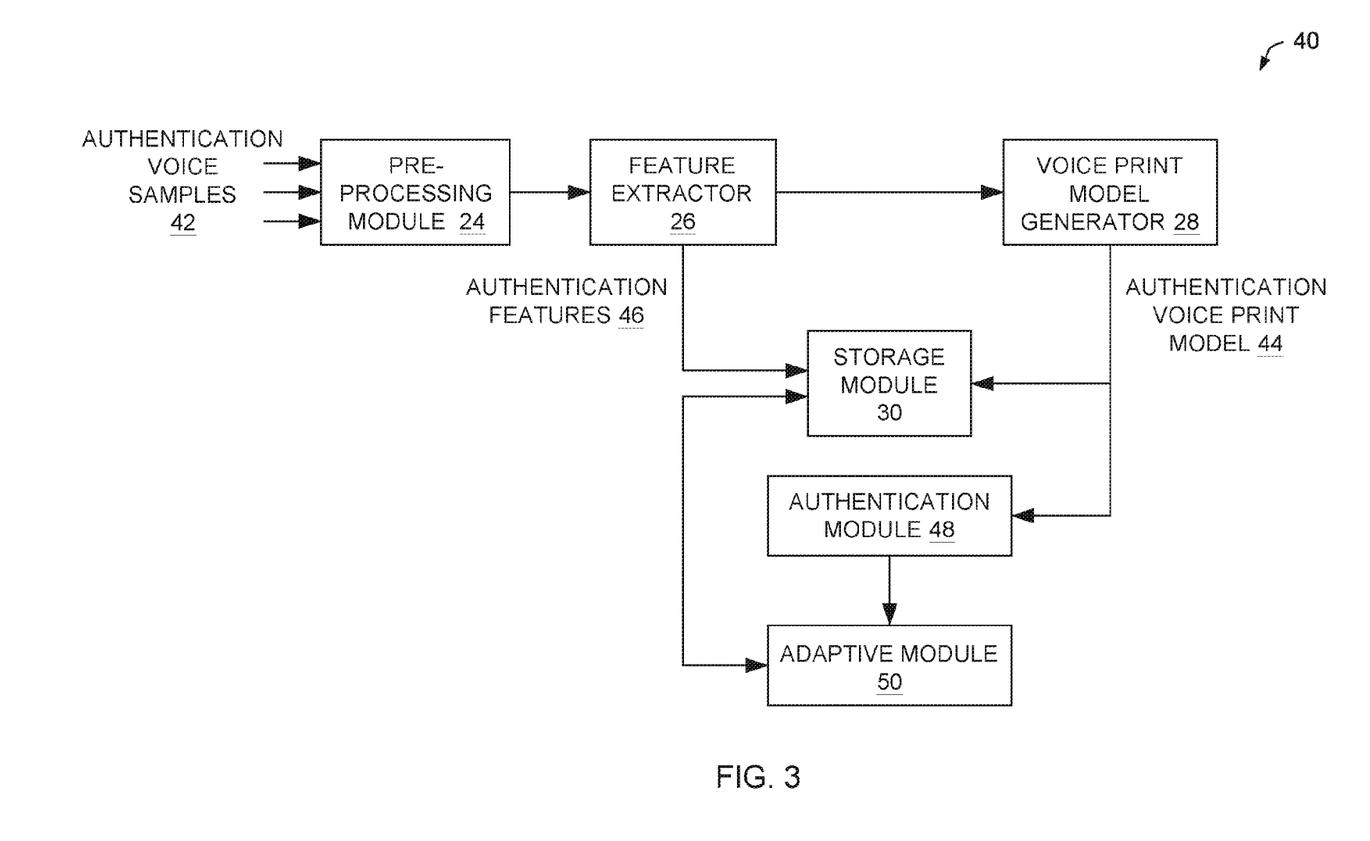
FIG. 3 is a block diagram of an example embodiment of an adaptive voice authentication system illustrating the components of voice authentication application implemented according to aspects of the present technique.

FIG. 3 is a block diagram of an example embodiment of an adaptive voice authentication system illustrating the components of voice authentication application implemented according to aspects of the present technique. The user's voice samples (as represented by reference numeral 42) are received by the pre-processing module 24. The received voice samples at the time of authentication are the user's authentication voice samples 42. In one embodiment, the authentication process is activated every time the user uses the system subsequently to gain access to the system. In the course of the authentication process, the user's authentication voice samples 42 are received by the pre-processing module 24.

Pre-processing module 24 is configured to improve the user's authentication voice sample 42 by filtering a plurality of distortion elements. In one embodiment, the pre-processing module 24 is configured to employ filtering operations comprising clipping, smoothening and amplifying the user's enrolment voice sample and the user's authentication voice sample to generate corresponding improved voice samples. As a result of implementation of the pre-processing module 24, the authentication rates are improved for all the speakers using variety of microphones under different loudness and noisy conditions.

Feature extractor 26 is configured to receive the user's pre-processed authentication voice sample and further configured to extract a plurality of authentication features (as represented by reference numeral 46) from the user's pre-processed authentication voice sample 42. The plurality of authentication features 46 comprise vocal tract shape and length, short term and long term energy, fundamental pitch, formant features, speaking rate, prosody features, language and accent, nasality, cepstrum, emotional state or combinations thereof.

In one embodiment, the plurality of authentication features 46 extracted from the user's pre-processed authentication voice sample are then used to generate an authentication voice print model as represented by reference numeral 44. Voice print model generator 28 is configured to generate the authentication voice print model 44 from the user's pre-processed authentication voice features 46. Storage module 30 is configured to store the plurality of authentication features 46 and the authentication voice print model 44. As described above in FIG. 1, the storage module 30 also comprises the enrolment features 32 and the enrolment voice print model 34 stored therein.

Authentication module 48 is configured to receive the authentication voice print model 44 and authenticate the user based on the stored enrolment voice print model 34. In one example embodiment, to authenticate a user, the enrolment voice print model 34 is compared against the user's incoming authentication voice print model 44 using likelihood ratios to output a score. Based on the score, the incoming authentication voice print model 44 is either rejected or accepted as being that of the proposed user. The identity of the user is verified during the authentication phase to provide access to the user to a particular system. In this example, the system compares the speech of the user with an existing enrolment voice print model 34 stored in the storage module 30 and based on the comparison value above a threshold value, the user is either accepted or else it is rejected.

Adaptive module 50 is configured to compare the plurality of authentication features 46 with the plurality of enrolment features 32 and dynamically replace and store one or more enrolment features 32 with one or more authentication features 46 based on a feature quality index. The adaptive module 50 is configured to generate an updated enrolment voice print model from the plurality of the updated enrolment features. The adaptive module 50 is further configured to compare the updated enrolment voice print model with the previously stored enrolment voice print model and dynamically update the previously stored enrolment voice print model with the updated enrolment voice print model based on a model quality index. The feature quality index and the model quality index is determined based on parameters like signal to noise ratio, dynamic range level, loudness and consistency of the corresponding enrolment features 32 and the authentication features 46. The storage module 30 is further configured to store the feature quality index and the model quality index.

The adaptive module 50 comprises a comparator configured to compare each authentication feature 46 with all the enrolment features 32. This comparison is initiated each time an authentication is initiated. The adaptive module 50 is further configured to replace one or more of the plurality of enrolment features 32 with authentication features 46 of a higher quality index. The replacement of the one or more of the lower quality enrolment features 32 with a higher quality authentication feature 46 is done each time authentication is initiated for the user. This replacement improves the overall authentication rates of the system.

In one embodiment, the replaced enrolment features are then used to generate a new updated enrolment voice print model. The comparator is further configured to compare the quality of the updated enrolment voice print model with the previously stored enrolment voice print model 34. This comparison is initiated each time the enrolment features are updated. The adaptive module 50 is further configured to replace the previously stored enrolment voice print model 34 with updated enrolment voice print model of a higher quality.

As used herein, the enrolment voice print model is an initial voice print model that is generated for the first time and the updated enrolment voice print model is the voice print model generated every time an authentication is initiated. The updated enrolment voice print model is generated using the updated features of a higher quality.

The implementation of the pre-processing module 24 and the adaptive module 50 in the adaptive voice authentication system improves the authentication rates for all the speakers with a variety of microphones under different loudness and noisy conditions. It may be noted that pre-processing module 24 and the adaptive module 50 are independent of the authentication module 48. Hence, the pre-processing module 24 and the adaptive module 50 can be used with other systems too if needed. The manner in which one or more enrolment features are dynamically updated with the authentication features of a higher quality is described in further detail below.

Figure 4:
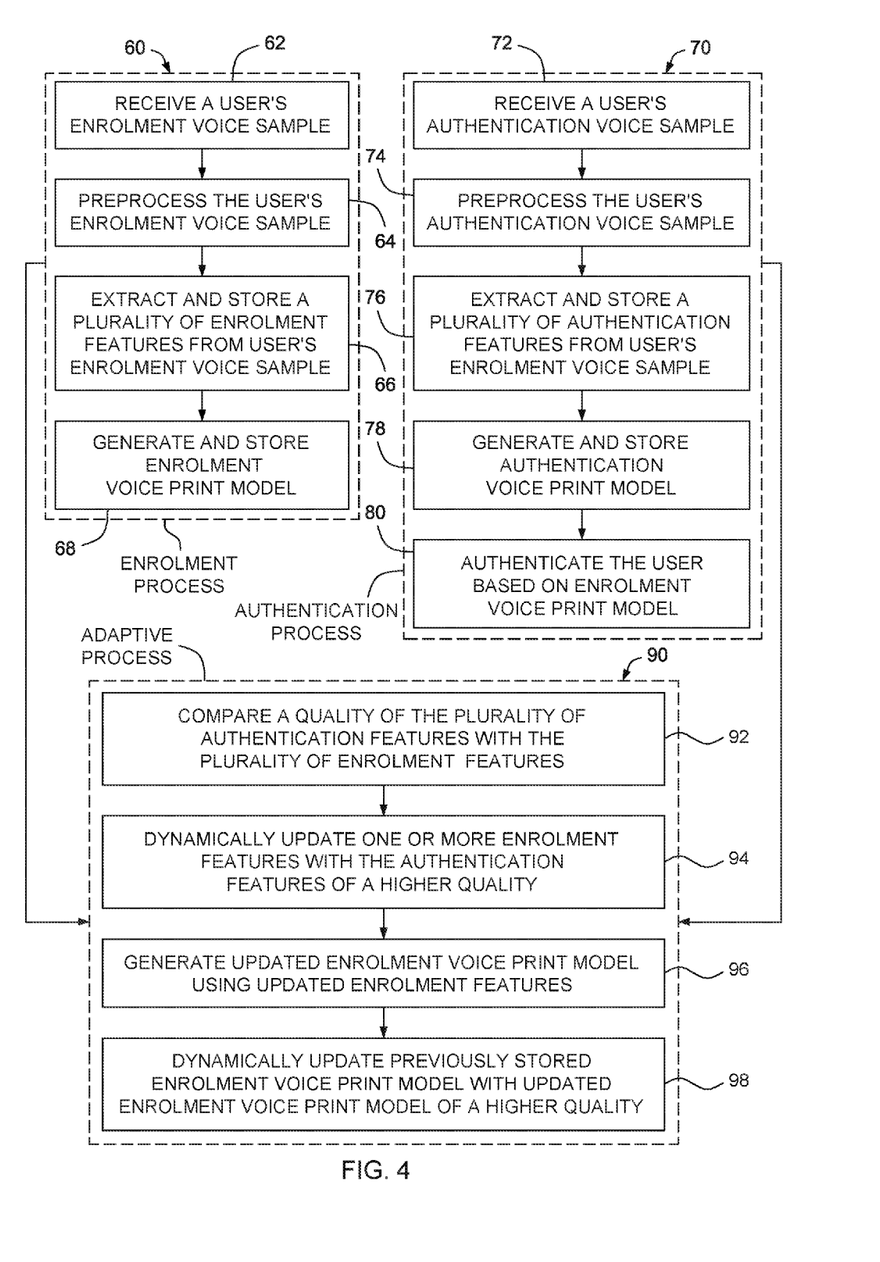
FIG. 4 is a flow chart illustrating an enrolment process, an authentication process and an adaptive process implemented according to aspects of the present technique.

FIG. 4 is a flow chart illustrating an enrolment process, an authentication process and an adaptive process implemented according to aspects of the present technique. Each step of the enrolment process, the authentication process and the adaptive process is described in further detail below.

In particular, the process 60 is used to generate and store a plurality of enrolment features and an enrolment voice print model. At step 62, a user's enrolment voice sample is received. In one embodiment, the enrolment voice sample is received during the enrolment process which is typically done when the user uses the authentication application for the first time and is usually done only once. At step 64, the user's enrolment voice sample is pre-processed. As described above, the enrolment process is done only once. During the enrolment process, in case any of the voice sample metrics is below an optimal level but is still above the user specified threshold, it can potentially degrade the system in the long run due to mismatches between initial enrolment and authentication samples. As a result, a pre-processing technique is implemented on the user's enrolment voice sample to ensure that the enrolment voice samples are obtained in a consistent fashion and is agnostic to channel and other environmental factors. The pre-processing techniques implemented on the enrolment voice samples is described in detail below.

At step 66, a plurality of enrolment features from the user's enrolment voice sample are extracted and stored. In one embodiment, to construct a voice print model for the user, some salient features are extracted from the user's voice sample. These features capture some generic as well as user specific information. The features extracted from the user's voice sample may comprise vocal tract shape and length, short term and long term energy, fundamental pitch, formant features, speaking rate, prosody features, language and accent, nasality, cepstrum, emotional state or combinations thereof. The features may be captured by the frontend module every 10 milliseconds using a 25 milliseconds sliding window. In one example embodiment, for a user's voice sample of one second, 100 such feature vectors may be collected. The features might be extracted only for speech only frames and ignored for the silence and noise frames. The features may then be utilized to construct and generate the voice print model of the user.

At step 68, an enrolment voice print model from the user's enrolment features is generated and stored. In one embodiment, the user's enrolment features are used to generate the enrolment voice print model using statistical methods. As used herein, the enrolment voice print model is the initial voice print model that is generated for the first time. This initial enrolment voice print model is used for the purpose of authentication.

Referring now to the flow chart 70, an authentication process used to generate and store a plurality of authentication features and an authentication voice print model is described. At step 72, a user's authentication voice sample is received. In one embodiment, the user's authentication voice sample is received every time the user uses the system subsequently to gain access to the system. At step 74, the user's authentication voice sample is pre-processed by implementing the pre-processing techniques.

The pre-processing technique implemented on the enrolment and authentication voice samples is described herein. In one embodiment, the preprocessing techniques employ filtering operations comprising clipping, smoothening and amplifying the user's enrolment voice sample and the user's authentication voice sample to generate corresponding improved voice samples. For conciseness, clipping is a form of waveform distortion mechanism that occurs when an amplifier is overdriven and attempts to deliver an output voltage or current beyond its maximum capability. When a sequence of continuous voice samples cross a particular threshold, then it implies that the voice samples have been clipped. When the clipped samples are more in the voice signal then the voice sample is rejected or else the clipping may be ignored.

In one embodiment, the smoothening mechanism involves the use of high pass filters. The low frequency signals sampled at high sampling rate tend to yield adjacent samples of similar numerical value. The reason is that low frequency essentially means slow variation in time. So the numerical values of a low frequency signal tend to change slowly or smoothly from sample to sample. The smoothening mechanism involves removal of the part of the signal that does not change in relation to its adjacent samples keeping the part of the signal that changes rapidly i.e. its high frequency components. The equation used for smoothening mechanism is represented as '$yt = \alpha xt + (1-\alpha) xt-1$', where '$xt$' is the time domain sample at time '$t$'. In one embodiment, the smoothening mechanism involves boosting the voice sample amplitude such that the amplitude of the voice sample is boosted to desired level. The scaling factor is obtained from ratio of desired level voice sample and the maximum amplitude of input signal. The signal is scaled with determined scaling factor to amplify the signal.

In one example embodiment, the benefits of implementing a preprocessing technique was analyzed experimentally with a set of 100 users. In this example, voice samples of a set of 100 users were collected in a variety of environments like noisy conditions, using low quality microphones, speaking loudly and softly. The enrolment voice print model generated using these voice samples were observed with and without preprocessing mechanism. The quality of the enrolment voice print model with implementation of pre-processing techniques was about 94 percent as compared to that of enrolment voice print model without implementation of pre-processing techniques which was about 81 percent.

Continuing with the authentication process 70, at step 76, a plurality of authentication features from the user's authentication voice sample are extracted and stored. At step 78, an authentication voice print model from the user's authentication voice features are generated. At step 80, the user is authenticated based on the stored initial enrolment voice print model. In one embodiment, the identity of the user is verified during this phase to provide access. The authentication voice print model of the user is compared with an initial stored enrolment voice print model and based on the comparison scores the user is either accepted or rejected.

Referring now to flow chart 90, an adaptive process used to identify and dynamically update one or more enrolment features and to determine an updated enrolment voice print model of higher quality is described. At step 92, a quality of the plurality of authentication features is compared with the plurality of enrolment features. In one embodiment, a feature quality index of the plurality of authentication features and the plurality of enrolment features is compared. At step 94, one or more enrolment features are dynamically updated with the authentication features of a higher quality. At step 96, updated enrolment voice print model is generated using updated enrolment features. At step 98, previously stored enrolment voice print model is dynamically updated with updated enrolment voice print model of a higher quality. The manner in which the updated enrolment voice print model of higher quality is determined every time an authentication is initiated to provide enhanced enrolment and authentication rates for users of the authentication system using specific examples are further described in FIG. 5.

Figure 5:
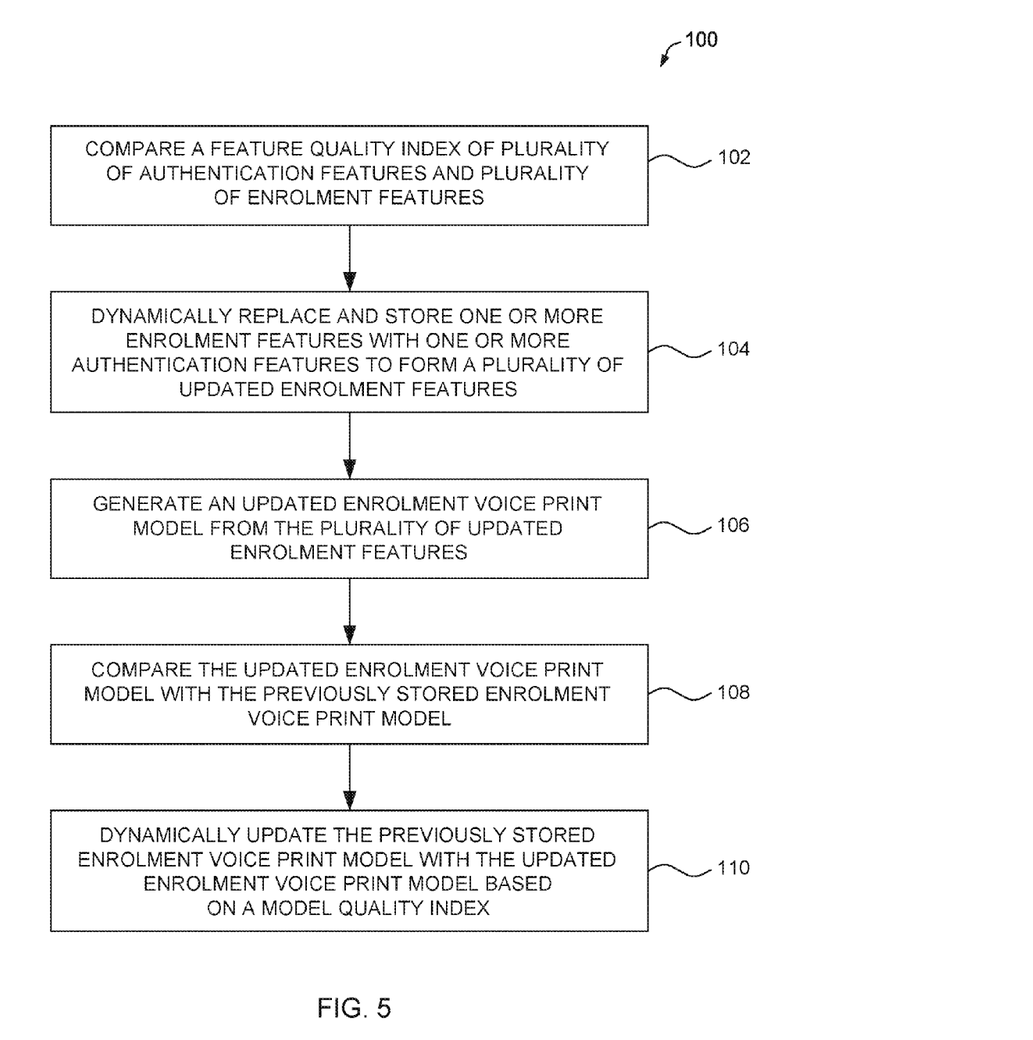
FIG. 5 is a flow chart illustrating one method by which one or more enrolment features and an updated enrolment voice print model of a higher quality is determined each time an authentication is initiated, implemented according to aspects of the present technique.

FIG. 5 is a flow chart illustrating one method by which one or more enrolment features and an updated enrolment voice print model of a higher quality is determined each time an authentication is initiated, implemented according to aspects of the present technique. In particular, the process 100 is used for dynamically updating the previously stored enrolment voice print model with an updated enrolment voice print model of a higher quality each time an authentication is initiated. Each step is described in further detail below.

At the time of authentication process, the authentication voice print model of the user is compared with the initial stored enrolment voice print model and based on the comparison scores the user is either accepted or rejected. When the user is authenticated, at step 102, a feature quality index of plurality of authentication features and plurality of enrolment features is compared. In one embodiment, the plurality of enrolment features are extracted from the received user's enrolment voice sample and a plurality of authentication features are extracted from the user's authentication voice sample.

At step 104, one or more enrolment features are dynamically replaced and stored with one or more authentication features to form a plurality of updated enrolment features. At step 106, an updated enrolment voice print model is generated from the plurality of the updated enrolment features. At step 108, the updated enrolment voice print model is compared with the previously stored enrolment voice print model. At step 110, the previously stored enrolment voice print model is dynamically updated with the updated enrolment voice print model based on a model quality index. In one embodiment, the feature quality index and the model quality index is determined based on parameters like signal to noise ratio, dynamic range level, loudness and consistency of the corresponding enrolment features and the authentication features.

The process described in FIG. 5 of the present invention will be described below in further detail with examples thereof, but it should be noted that the present invention is by no means intended to be limited to these examples.

In one example embodiment, the enrolment process is implemented when the user uses the system for the first time and is typically done only once. In the course of the enrolment process, the user's enrolment voice samples are pre-processed to improve its quality by filtering a plurality of distortion elements. In this example, during the enrolment process, three set of voice samples are collected from the user. The voice samples are used to build the initial profile (i.e enrolment voice print model) for the user. The three voice samples are pre-processed and the plurality of enrolment voice features are extracted. In this example, the three voice features extracted from the three voice samples are represented as "E1, E2, and E3". An initial voice print model known as enrolment voice print model for the user is generated using these three features. The enrolment features are then stored for the future adaptation process.

The authentication process is implemented every time, when the user uses the system subsequently to gain access to the services. During the authentication process, the authentication features are extracted from the pre-processed authentication voice samples. For example, when the user is authenticated, let the authentication features extracted from the authentication voice samples be represented as V1, V2, V3 . . . Vn, which are used to generate authentication voice print model. After a few iterations, each one of the authentication features extracted from the collected voice samples (as represented by V1, V2 . . . Vn) are compared to the stored enrolment voice features E1, E2, E3 for better sample quality. For example, when E2 voice feature has a low quality compared to other features and V3 voice feature has a better quality as compared to E2 voice feature, then V3 is chosen to replace E2. In this example, E1, V3 and E3 are the updated set of enrolment voice features.

Furthermore, an updated enrolment voice print model is generated and stored using the updated set of voice features. The newer updated enrolment voice print model has a higher likelihood score for the user than the previous voice print model. The updated enrolment voice print model is then used as the default enrolment voice print model for the user. For example, E1, V3, E3 are the updated set of extracted features of the received voice samples. A new enrolment voice print model is created using these updated features of the received voice samples. For the future authentications, this new and updated enrolment voice print model is then compared against the current voice print model using other samples as input. When the updated voice print model scores better, then it is chosen as the default voice print model for the user. For example, E2 may be then discarded and other verification features of the received voice samples become part of the test data pool. The process is continued for more iterations of authentication.

The quality index of the enrolment voice print model and the authentication voice print model is determined based on parameters such as signal to noise ratio, dynamic range level, loudness and consistency of the corresponding enrolment voice print model and the authentication voice print model. When the majority of the parameters described herein are better than any of the currently stored enrolment voice print model, the worst feature of the received voice sample is chosen for replacement. The newer voice feature of the received voice sample chosen for replacement while being better should not be significantly better than the current values of the parameters.

As a result, the above process described herein ensures that the enrolment voice print model gets better overtime but at the same time it is a gradual change. This ensures a smoothening effect over time.

In an experimental analysis, around 1000 users were chosen of which 300 users enrolled their voice samples with their loudness being low, low SNR's etc. These 300 users were then authenticated using the authentication system with and without the adaptive module. The accuracy of the system using the adaptive module improved by over 15 percent. This process was then automated to ensure that the voice print models are updated automatically based on certain preset thresholds for speech quality parameters and the likelihood scores.

The adaptive voice authentication system disclosed herein ensures that the adaptive module tracks the user's change in voice characteristics automatically without having the user to enroll every time there is a biological or ambience change. By adapting the voice print model from time to time based on authentication session voice sample, enrolment process is avoided. In addition, slight change in user's voice due to health issues like cold, sore throat etc. are handled automatically by the system by not adapting the user voice print for that session. Furthermore, the pre-processing technique applied for removal of noise and channel conditions also ensures that the user does not have to enroll every time there is a change in surrounding environment or a change in microphone (could be due to a change in cell phone from the user's side). Thus, by using user profile adaptation automatically and normalization techniques in the voice authentication systems, the usability of the system described herein is increased by over twenty five percent reasonably.

Figure 6:
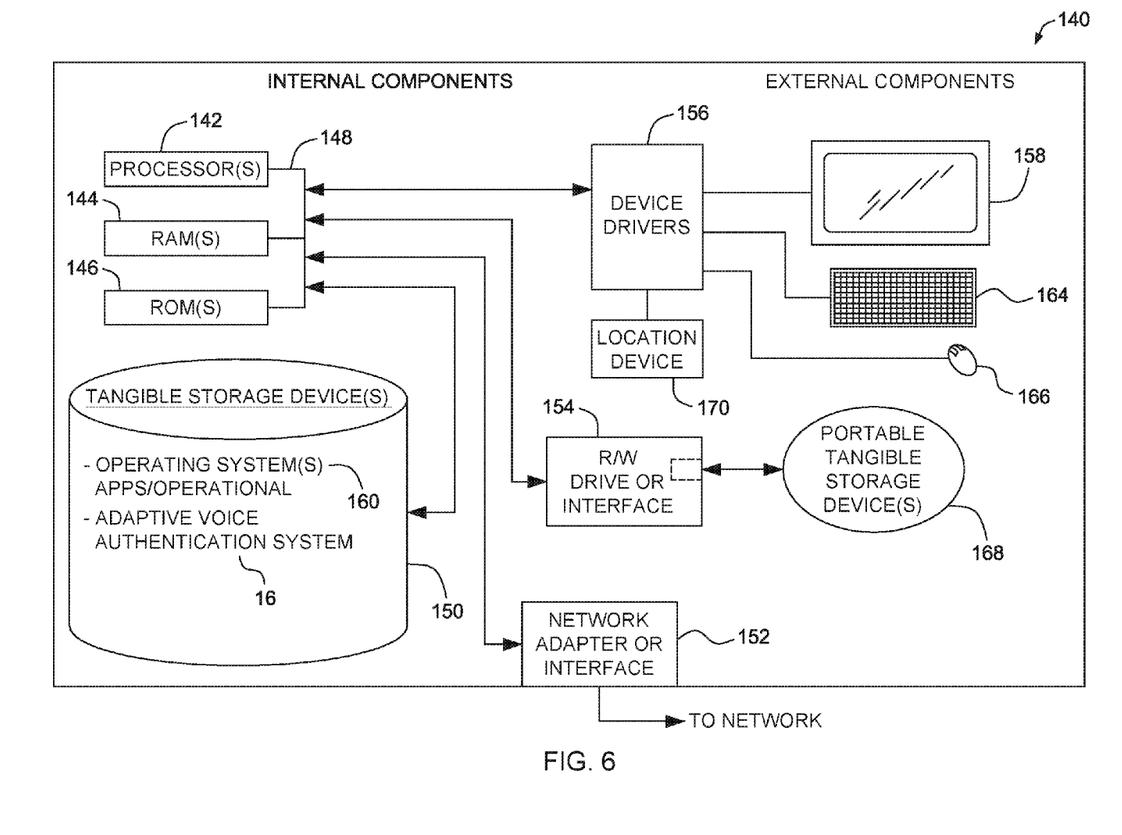
FIG. 6 is a block diagram of an embodiment of a computing device executing modules of an adaptive voice authentication system, in accordance with an embodiment of the present invention.

FIG. 6 is a block diagram of an embodiment of a computing device executing modules of an adaptive voice authentication system, in accordance with an embodiment of the present invention. The modules of the adaptive voice authentication system described herein are implemented in computing devices. One example of a computing device 140 is described below in FIG. 6. The computing device comprises one or more processor 142, one or more computer-readable RAMs 144 and one or more computer-readable ROMs 146 on one or more buses 148. Further, computing device 140 includes a tangible storage device 150 that may be used to execute operating systems 160 and adaptive voice authentication system 16. The various modules of the adaptive voice authentication system 16 including a pre-processing module 24, a feature extractor 26, a voice print model generator 28, and a storage module 30 can be stored in tangible storage device 150. Both, the operating system and the adaptive voice authentication system 16 are executed by processor 142 via one or more respective RAMs 144 (which typically include cache memory).

Examples of storage devices 150 include semiconductor storage devices such as ROM 146, EPROM, flash memory or any other computer-readable tangible storage device that can store a computer program and digital information.

Computing device also includes a R/W drive or interface 154 to read from and write to one or more portable computer-readable tangible storage devices 168 such as a CD-ROM, DVD, memory stick or semiconductor storage device. Further, network adapters or interfaces 152 such as a TCP/IP adapter cards, wireless wi-fi interface cards, or 3G or 4G wireless interface cards or other wired or wireless communication links are also included in computing device.

In one embodiment, the adaptive voice authentication system 16 can be downloaded from an external computer via a network (for example, the Internet, a local area network or other, wide area network) and network adapter or interface 152. Computing device further includes device drivers 156 to interface with input and output devices. The input and output devices can include a computer display monitor 158, a keyboard 164, a keypad, a touch screen, a computer mouse 166, and/or some other suitable input device.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An adaptive voice authentication system comprising:
a memory configured to store computer-readable instructions; and
a processor configured to execute the computer-readable instructions to,
receive an enrolment voice sample of a user and an authentication voice sample of the user;
extract a plurality of enrolment features from the enrolment voice sample and a plurality of authentication features from the authentication voice sample;
generate an enrolment voice print model from the plurality of enrolment features and an authentication voice print model from the plurality of authentication features;
receive the authentication voice print model and authenticate the user based on the enrolment voice print model;
store the plurality of enrolment features, the plurality of authentication features, the enrolment voice print model, and the authentication voice print model;
compare a feature quality index of the plurality of authentication features and the plurality of enrolment features each time an authentication of the user is initiated, wherein the feature quality index is determined based on one or more of a signal to noise ratio, dynamic range level, loudness, and consistency of the plurality of enrolment features and the plurality of authentication features;
dynamically update one or more enrolment features with one or more corresponding authentication features to form one or more updated enrolment features in response to the feature quality index being greater than or equal to a feature quality threshold value, the one or more corresponding authentication features being of a higher quality than the one or more enrolment features;
generate an updated enrolment voice print model using the one or more updated enrolment features;
compare the updated enrolment voice print model with the stored enrolment voice print model using another voice sample of the user as input; and
dynamically update the stored enrolment voice print model with the updated enrolment voice print model, in response to the updated enrolment voice print model having a higher likelihood score for the user than the stored enrolment voice print model, based on a model quality index, wherein the model quality index is determined based on one or more of a signal to noise ratio, dynamic range level, loudness, and consistency of the enrolment voice print model and the authentication voice print model.

2. The adaptive voice authentication system of claim 1, wherein the plurality of enrolment features and the plurality of authentication features comprise vocal tract shape and length, short term and long term energy, fundamental pitch, formant features, speaking rate, prosody features, language and accent, nasality, cepstrum, emotional state or combinations thereof.

3. The adaptive voice authentication system of claim 1, the processor is further configured to execute the computer-readable instructions to improve the enrolment voice sample and the authentication voice sample by filtering a plurality of distortion elements.

4. The adaptive voice authentication system of claim 3, wherein filtering the plurality of distortion elements includes employing one or more filtering operations comprising clipping, smoothening, and amplifying the enrolment voice sample and the authentication voice sample to generate an improved enrolment voice sample and an improved authentication voice sample.

5. The adaptive voice authentication system of claim 1, wherein the processor is configured to execute the computer-readable instructions to compare each authentication feature with all of the plurality of enrolment features each time an authentication of the user is initiated.

6. The adaptive voice authentication system of claim 1, wherein the processor is configured to execute the computer-readable instructions to compare the model quality index each time the one or more enrolment features are updated with the one or more corresponding authentication features of a higher quality to form the one or more updated enrolment features.

7. The adaptive voice authentication system of claim 1, wherein the processor is configured to execute the computer-readable instructions to store the feature quality index and the model quality index.

8. A method for dynamically updating one or more enrolment features and an enrolment voice print model, the method comprising:
receiving an enrolment voice sample of a user and an authentication voice sample of the user;
extracting a plurality of enrolment features from the enrolment voice sample and a plurality of authentication features from the authentication voice sample;
generating an enrolment voice print model from the plurality of enrolment features and an authentication voice print model from the plurality of authentication features;
authenticating the user based on the enrolment voice print model;
storing the plurality of enrolment features, the plurality of authentication features, the enrolment voice print model, and the authentication voice print model;
comparing a feature quality index of the plurality of authentication features and the plurality of enrolment features each time an authentication of the user is initiated, wherein the feature quality index is determined based on one or more of a signal to noise ratio, dynamic range level, loudness, and consistency of the plurality of enrolment features and the plurality of authentication features;
dynamically updating one or more enrolment features with one or more corresponding authentication features to form one or more updated enrolment features in response to the feature quality index being greater than or equal to a feature quality threshold value, the one or more corresponding authentication features being of a higher quality than the one or more enrolment features;

generating an updated enrolment voice print model using the one or more updated enrolment features;

comparing the updated enrolment voice print model with the stored enrolment voice print model using another voice sample of the user as input; and dynamically updating the stored enrolment voice print model with the updated enrolment voice print model, in response to the updated enrolment voice print model having a higher likelihood score for the user than the stored enrolment voice print model, based on a model quality index, wherein the model quality index is determined based on one or more of a signal to noise ratio, dynamic range level, loudness, and consistency of the enrolment voice print model and the authentication voice print model.

9. The method of claim 8, wherein the plurality of enrolment features and the plurality of authentication features comprise vocal tract shape and length, short term and long term energy, fundamental pitch, formant features, speaking rate, prosody features, language and accent, nasality, cepstrum, emotional state or combinations thereof.

10. The method of claim 8, further comprising:

improving the enrolment voice sample and the authentication voice sample by filtering a plurality of distortion elements, wherein filtering the plurality of distortion elements includes employing one or more filtering operations comprising clipping, smoothening, and amplifying the enrolment voice sample and the authentication voice sample to generate an improved enrolment voice sample and an improved authentication voice sample.

11. The method of claim 8, further comprising comparing each authentication feature with all of the plurality of enrolment features each time an authentication of the user is initiated.

12. The method of claim 8, wherein comparing the model quality index is performed each time the one or more enrolment features are updated with the one or more corresponding authentication features of a higher quality to form the one or more updated enrolment features.

13. The method of claim 8, further comprising storing the feature quality index and the model quality index.

* * * * *

UNITED STATES PATENT AND TRADEMARK OFFICE
CERTIFICATE OF CORRECTION

PATENT NO. : 9,940,934 B2
APPLICATION NO. : 15/064740
DATED : April 10, 2018
INVENTOR(S) : Umesh Sachdev It is certified that error appears in the above-identified patent and that said Letters Patent is hereby corrected as shown below:

On the Title Page

At item (73):
Assignee: UNIPHONE SOFTWARE SYSTEMS;
Should read:
--UNIPHORE SOFTWARE SYSTEMS--

Signed and Sealed this
Fifth Day of June, 2018

Andrei Iancu
*Director of the United States Patent and Trademark Office*